United States Patent
Kohrt

(10) Patent No.: US 7,487,765 B1
(45) Date of Patent: Feb. 10, 2009

(54) INTAKE AIR HEATER AND AIR DELIVERY ASSEMBLY FOR ENGINES

(75) Inventor: April Gulbrandson Kohrt, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 08/951,754

(22) Filed: Oct. 16, 1997

Related U.S. Application Data

(63) Continuation of application No. 08/552,987, filed on Nov. 3, 1995, now abandoned.

(51) Int. Cl.
  *F02M 31/00* (2006.01)

(52) U.S. Cl. ..................................... 123/549

(58) Field of Classification Search .............. 123/549, 123/556, 184.38, 184.42, 184.24, 184.47, 123/142.5 E, 193.3, 193.5
  See application file for complete search history.

(56) References Cited

U.S. PATENT DOCUMENTS

| | | | |
|---|---|---|---|
| 909,898 A | 1/1909 | Hertzberg et al. ............ 123/549 |
| 909,899 A | 1/1909 | Hertzberg et al. ............ 123/549 |
| 1,276,083 A | 8/1918 | Lake .......................... 123/549 |
| 2,139,777 A | 12/1938 | Skok et al. .................. 123/549 |
| 2,142,210 A | 1/1939 | Rippingille ................. 123/179 |
| 2,177,840 A | 10/1939 | Roualet ...................... 123/549 |
| 3,091,228 A | 5/1963 | Maxwell ...................... 123/119 |
| 3,858,564 A * | 1/1975 | Beatenbough et al. 123/122 AB |
| 3,949,715 A * | 4/1976 | Faix et al. ............. 123/52 MC |
| 3,977,377 A | 8/1976 | Reid ........................ 123/122 G |
| 4,108,953 A | 8/1978 | Rocco ......................... 261/142 |
| 4,325,344 A | 4/1982 | Igashira et al. .............. 123/549 |
| 4,363,958 A | 12/1982 | Kobayashi et al. .......... 219/505 |
| 4,465,053 A * | 8/1984 | Berg .......................... 123/549 |
| 4,512,322 A | 4/1985 | Barcy ......................... 123/549 |
| 4,667,644 A * | 5/1987 | Hori et al. .................. 123/549 |
| 4,682,576 A | 7/1987 | Nakamura et al. ...... 123/179 A |
| 4,685,437 A * | 8/1987 | Tanaka et al. ............... 123/549 |
| 4,926,812 A * | 5/1990 | Cailey ..................... 123/193 H |
| 5,005,535 A * | 4/1991 | Binversie et al. ......... 123/52 M |
| 5,179,927 A | 1/1993 | Henke et al. ................ 123/549 |
| 5,595,164 A * | 1/1997 | Thimmesch ................. 123/549 |

FOREIGN PATENT DOCUMENTS

| | | |
|---|---|---|
| DE | 3101881 | 8/1982 |
| DE | 4121075 | 1/1993 |
| GB | 280555 | 3/1928 |
| JP | U 1 174560 | 12/1989 |

* cited by examiner

*Primary Examiner*—Hieu T Vo
(74) *Attorney, Agent, or Firm*—Studebaker & Brackett PC; Tim L. Brackett, Jr.

(57) ABSTRACT

A unitized intake air delivery assembly is provided which minimizes the size of an engine by integrating the intake manifold and intake air heater within the cylinder head of the engine. In addition, an intake air heater is provided which can be easily mounted on existing engines with minimal expense and modifications. The air heater includes a heating element and a supporting frame wherein the heating element and substantially the entire heater frame is supported in the intake air passage formed by the delivery conduit and the intake air manifold. The frame includes a mounting flange of minimal thickness extending between the cylinder head and the air delivery conduit so as to minimize the impact of the air heater on the height of the engine. An electrical connection to the heating element is provided through a connector aperture formed in the side wall of the cylinder head.

20 Claims, 2 Drawing Sheets

INTAKE AIR HEATER AND AIR DELIVERY ASSEMBLY FOR ENGINES

This application is a Continuation of Ser. No. 08/552,987, filed Nov. 3, 1995, now abandoned.

TECHNICAL FIELD

This invention relates to an improved intake air heater assembly for an internal combustion engine which permits simple, effective mounting of the air heater on the engine while minimizing the size of the engine.

BACKGROUND OF THE INVENTION

It is well known that when ambient air temperatures are sufficiently low, a diesel engine requires assistance, such as the heating of intake air, to enable the engine to start. As a result, efforts have been made to improve cold engine starting and warming-up providing a means for increasing the temperature of the intake air. In addition, modern turbocharged and aftercooled engines require heating of intake air during certain operating conditions to avoid the occurrence of white smoke and other undesirable exhaust emissions. U.S. Pat. No. 3,977,377 to Reid discloses one approach to heating the intake air which includes a burner for injecting a spray of fuel into a burner assembly for combustion with intake air. A flame is produced which heats the intake air sufficiently to permit start up or minimize white smoke emissions. However, the burner assembly requires a separate housing mounted on an intake manifold which is formed separately from the engine cylinder head. Therefore, the burner assembly of Reid disadvantageously increases the overall size of the engine. Moreover, burner type air heaters have been found inferior to other heaters in certain applications, and are often complex and expensive as compared to other viable heating systems.

Another type of conventional air heater is an electrical resistance heater using a pattern of wires which generate heat when carrying electric current. U.S. Pat. No. 1,276,083 to Lake discloses one type of electrical heater for an engine including a ring positioned in each cylinder of the engine. The ring is connected to a source of electric power and becomes sufficiently hot when subjected to current so as to raise the temperature within the combustion chamber prior to starting the engine thereby ensuring fuel ignition and engine starting. However, this design requires an electric plate in each engine cylinder and therefore is expensive and difficult to maintain. Moreover, this design requires a specifically designed cylinder head with various connections not found on many conventional engines. Therefore, the Lake heater could not be retrofitted on most existing engines without unreasonable costs associated with either major modifications to existing cylinder heads or providing a completely new cylinder head. U.S. Pat. Nos. 909,898, 909,899 and 1,327,384 all disclose electrical fuel vaporizers positioned in the engine cylinders for assisting in the ignition of fuel. However, these devices all suffer from the same drawbacks of the heater disclosed in Lake.

U.S. Pat. Nos. 4,682,576 to Nakamura et al. and 2,177,840 to Roulalet both disclose an electric air heater positioned in an intake air manifold. However, the electric heater is positioned upstream of the cylinder head and the intake manifold is formed separately from the engine cylinder head. Consequently, the mounting of the heater increases the number of joints along the manifold which must be sealed. In addition, the air heater and manifold add to the outer extent of the engine thus often increasing the size of the engine beyond the packaging constraints of a particular application.

German Publication No. 4121075 generally discloses an air heater positioned in a branch duct communicating with only one cylinder. U.S. Pat. Nos. 2,139,777, 4,108,953 and 4,325,344 all disclose fuel vaporizing devices mounted in intake manifolds formed separately from an engine cylinder head. The heaters and air delivery assemblies disclosed in all these references suffer from many of the disadvantages noted hereinabove.

Consequently, there is a need for an intake air heater and air delivery assembly capable of simple, inexpensive integrated mounting on engines while minimizing the size of the engine.

SUMMARY OF THE INVENTION

It is an object of the present invention, therefore, to overcome the disadvantages of the prior art and to provide a simple, inexpensive air heater and air delivery system capable of effectively heating the engine intake air.

It is another object of the present invention to provide an air heater capable of being mounted in an intake manifold formed integrally in a cylinder head of an engine.

It is yet another object of the present invention to provide an air heater for mounting in an air delivery system so as to minimize the size of the intake assembly thereby minimizing the size of the engine.

It is a further object of the present invention to provide an air heater positioned in an elongated air manifold which is capable of effectively heating the intake air flowing through the elongated manifold so as to aid in cold engine starting.

Another object of the present invention is to provide an air heater capable of being easily mounted on existing engines without significantly affecting the size of an intake air delivery assembly thereby maintaining the size of the engine within the packaging constraints of the engine application.

Yet another object of the present invention is to provide a unitized air delivery assembly including an intake manifold and heater integrated into the engine cylinder head.

These and other objects are achieved by providing an intake air heater capable of being mounted in an intake air manifold formed integrally in a cylinder head of an internal combustion engine for heating intake air flowing along an intake air flow path to multiple engine cylinders, comprising a heater frame member for attachment to the cylinder head and a heating element connected to the heater frame member for heating the intake air. The heating element is positioned within the integral intake air manifold formed in the cylinder head when the heater is mounted on the engine. The frame member further includes a flange portion positioned substantially in a single mounting plane so that the heating element is positioned on one side of the mounting plane along the intake air flow path downstream of the flange portion. The frame member may be elongated in shape and the flange portion may extend peripherally around the elongated frame member. Also, the frame member may include two side wall portions extending from the flange portion transverse to the mounting plane. The heating element is mounted between the two side wall portions and may include an electric resistance heater. One of the side wall portions may include an access port for providing access for an electrical connection between an electrical source and the heating element.

The present invention also provides an intake air delivery assembly for delivering intake air to multiple cylinders of an internal combustion engine having an engine block, comprising a cylinder head mounted on the engine block and including an integral intake manifold chamber formed therein for delivering intake air to the multiple cylinders of the engine. The intake air heater is mounted at least partially in the integral intake manifold chamber which may be formed in the top surface of the cylinder head opposite a cylinder head bottom surface engaging the cylinder block. The cylinder head preferably includes a connector aperture formed in one of its side surfaces for receiving an electrical connector connecting the heating element to an electrical source. The heater frame includes a mounting flange extending along the top surface of the cylinder block and side walls extending from the mounting flange into the integral intake manifold chamber for supporting the heating element. The air delivery assembly may further include an air delivery conduit mounted adjacent the top surface of the cylinder head. The delivery conduit defines an air delivery passage communicating with the integral intake manifold and includes a conduit flange. The conduit flange, heater mounting flange and the top surface of this cylinder head each include a plurality of mounting apertures, sets of which are aligned to receive respective mounting bolts for securing the flanges together.

The present invention also provides an intake air delivery assembly including a cylinder head having an integral intake manifold chamber for delivering intake air to multiple cylinders of the engine. The cylinder head includes a first surface for engaging the cylinder block and a second surface formed opposite the first surface. The intake air delivery assembly further includes an air delivery conduit mounted on the cylinder head adjacent to second surface for defining an air delivery passage. The assembly also includes an intake air heater including a heating element positioned in one or both of the integral intake manifold and the delivery conduit. The heater also includes a heater frame member for supporting the heating element which includes a flange portion positioned in compressive abutting relationship between the air delivery conduit and the second surface of the cylinder head. The flange portion of the frame member has a predetermined minimal thickness for minimizing the distance between the air delivery conduit and the top surface of the cylinder head.

DETAILED DESCRIPTION OF THE PREFERRED EMBODIMENT

Figure 1:
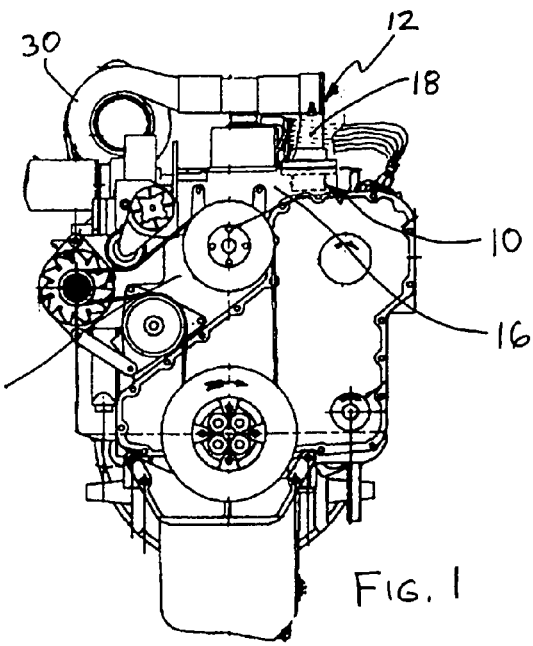
FIG. 1 is an end view of an engine incorporating the air heater and air delivery assembly of the present invention.
Figure 2:
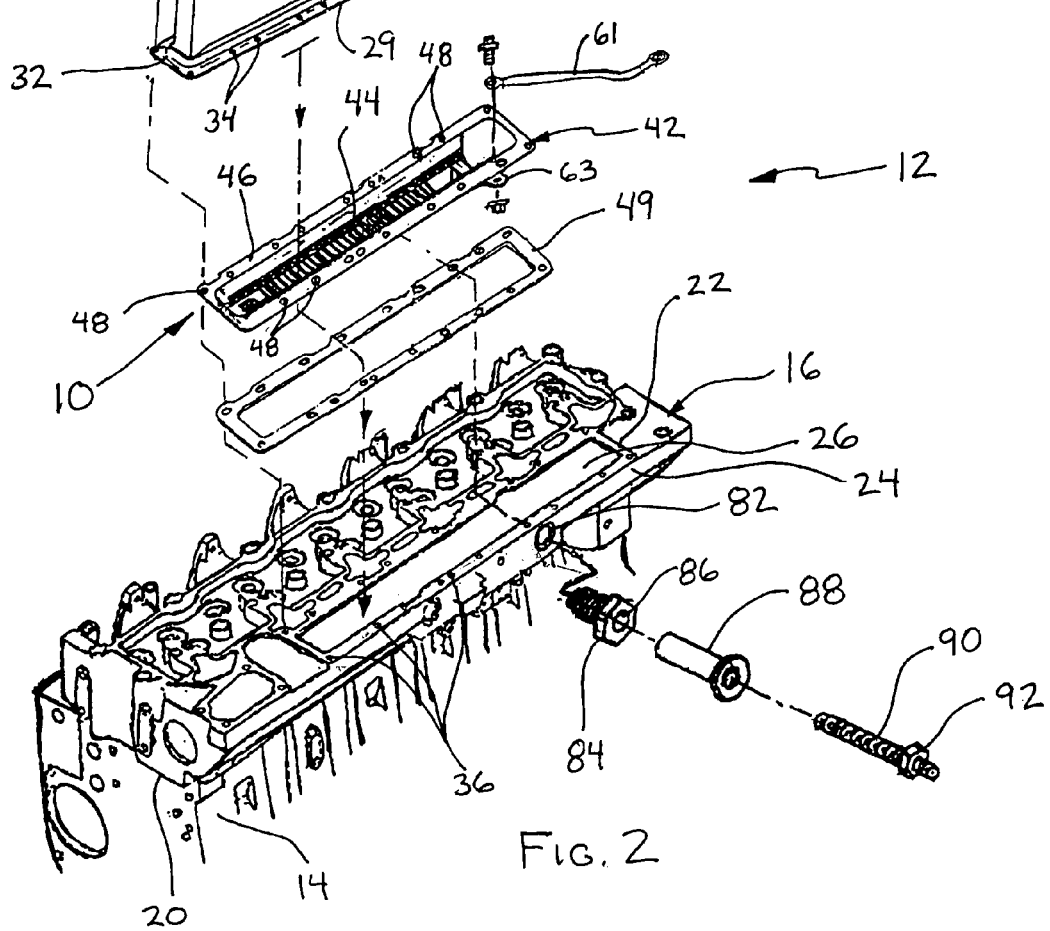
FIG. 2 is an elevational assembly drawing illustrating the connection of the components of the air delivery assembly of the present invention.

Referring to FIGS. 1 and 2, there is shown the air heater 10 of the present invention and the air delivery assembly 12 of the present invention as applied to a 6-cylinder engine having an engine block 14 containing engine cylinders (not shown). Generally, the air delivery assembly 12 includes the intake air heater 10 connected between a cylinder head 16 of the engine and an air delivery conduit 18 so that heater 10 can be selectively energized to heat the intake air flowing into the engine.

The cylinder head 16 includes a bottom surface 20 mounted in abutment with engine block 14, a top surface 22 formed opposite bottom surface 20 and side surfaces 24 connecting bottom surface 20 and top surface 22. A generally elongated intake air manifold 26 is formed integrally in cylinder head 16 and extending inwardly from top surface 22. Integral intake air manifold 26 is designed to deliver intake air received from air delivery conduit 18 to the various intake passages leading to each engine cylinder.

Air delivery conduit 18 includes an inlet port 28 for receiving intake air from, for example, a turbocharger 30 and an elongated outlet 29 for directing air into manifold 26. Conduit 18 also includes a conduit flange 32 extending around the periphery of outlet 29 to form a generally rectangularly shaped mounting surface corresponding to the top surface 22 of cylinder head 16 located around the periphery of intake air manifold 26. Air delivery conduit 18 also includes mounting apertures 34 formed in conduit flange 32 for alignment with corresponding apertures 36 formed in the top surface 22 of cylinder head 16. Air delivery conduit 18 may function not, only as an intake manifold cover for directing intake air into integral intake manifold 26, but also as an aftercooler or heat exchanger. As an aftercooler, conduit 18 functions to cool the intake air to increase the charge density of the air thereby permitting increased volumetric efficiency for improved engine performance. Conduit or aftercooler 18 includes an engine coolant inlet and outlet connections 38, 40 providing engine coolant flow through a bundle of tubes or heat exchanger passages (not shown) positioned within conduit 18.

Figure 3:
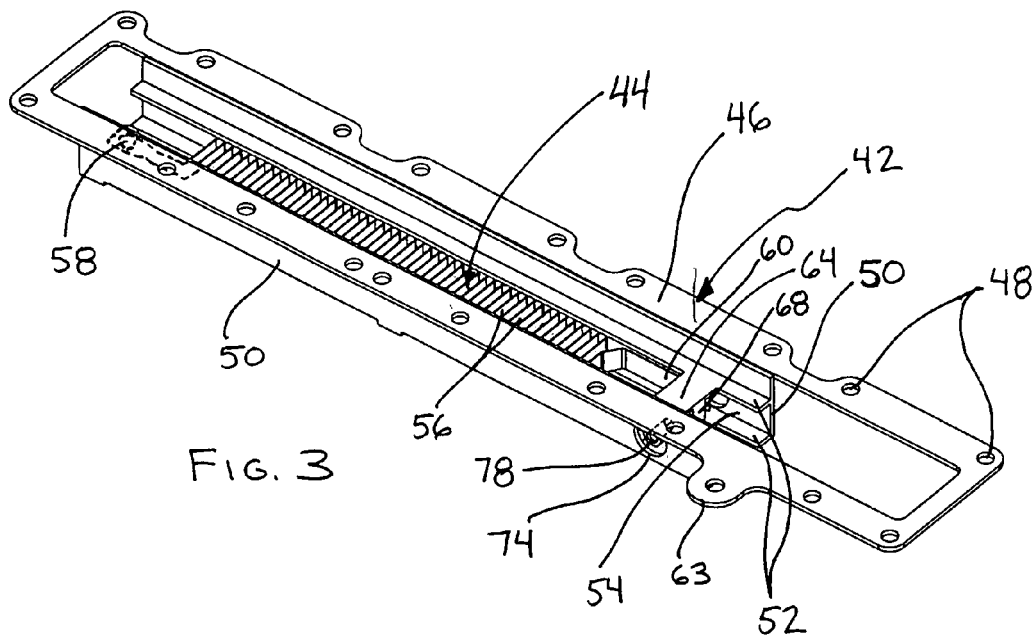
FIG. 3 is a perspective view of the air heater of the present invention.

In order to ensure optimum operation of the intake air heater assembly of the present invention, intake air heater 10 is positioned between conduit or aftercooler 18 and the intake ports of each engine cylinder. Intake air heater 10 includes a heater frame member 42 and a heating element 44 supported by frame 42. As shown in FIGS. 2 and 3, heater frame 42 includes a mounting flange portion 46 corresponding generally to the shape of conduit flange 32. Flange portion 46 includes mounting apertures 48 corresponding to and positioned for alignment with mounting apertures 34 and 36 of conduit flange 32 and cylinder head 16, respectively. A gasket 49 provides a sealed connection between flange 46 and cylinder head 16. Bolts 51 extend through each aligned set of mounting apertures to secure conduit 18 and heater 10 to cylinder head 16. Flange portion 46 is positioned generally in a single mounting plane for positioning between conduit flange 32 and top surface 22. Frame 42 further includes opposed side walls 50, each extending transversely in one direction from the inner edge of frame member 42. Each side wall 50 includes two spaced apart rails 52 extending toward the opposed side wall to form opposed elongated mounting grooves 54.

Heating element 44 is positioned between side walls 50 in each mounting groove 54. Heating element 44 is preferably an electric resistance heater formed from an elongated strip of electrical resistance material bent to form multiple spaced heating panels 56 extending between side walls 50. As shown in FIG. 3, heating element 44 is electrically isolated from frame 42 except at a ground connection at one end to heater frame 42 via a screw 58. An opposite end 60 of heating element 44 is connected to an electrical source via an electrical connector 62. Heater frame 42 is grounded by a grounding strap 61 connected at one end to a tab 63 extending from flange 46 and at an opposite end to the engine.

Figure 4:
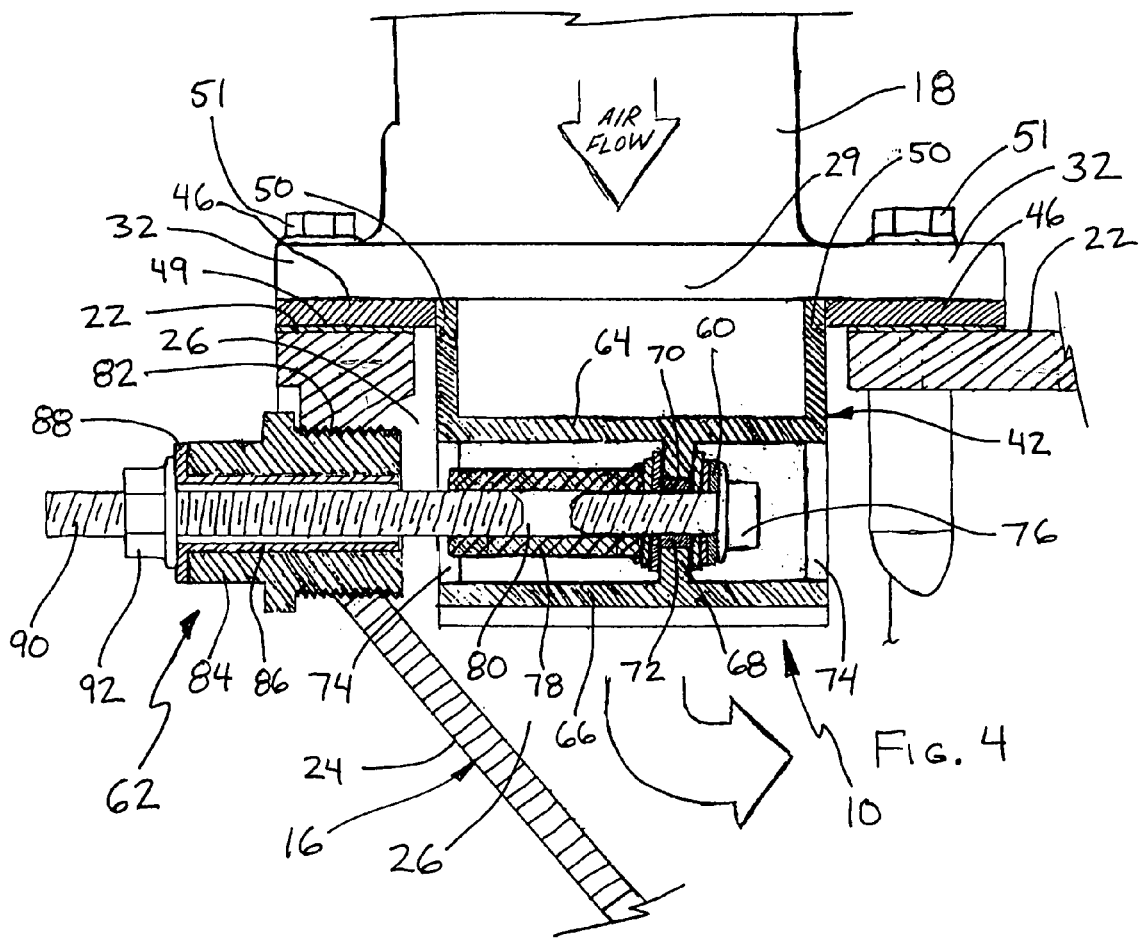
FIG. 4 is a partial cross sectional view of the air delivery assembly of the present invention.

Referring to FIG. 4, heater frame 42 further includes upper and lower transverse walls 64 and 66, respectively, extending between side walls 50 at the opposite end 60 of heating element 44. A vertical wall 68, positioned intermediate side walls 50, connects upper and lower walls 64, 66. Vertical wall 68 includes a central passage 70 within which an insulating grommet 72 is positioned. Side walls 50 of frame 42 each include an access port 74 positioned in alignment with central passage 70. Electrical connector 62 includes a cap screw 76 and an elongated nut 78 having a central bore 80. Cap screw 76 extends through an aperture formed in opposite end 60 of heating element 44 and through central passage 70 into central bore 80 so as to threadably engage nut 78. A set of washers positioned on both sides of vertical wall 68 separate nut 78 and the opposite end 60 of heating element 44 from contacting vertical wall 68 of frame 42. Moreover, cap screw 76 and nut 78 are formed of an electrically conductive material while grommet 72 and at least one of the washers on both sides of wall 68 are formed of an insulating material so as to electrically isolate nut 78, cap screw 76 and opposite end 60 from frame member 42.

A connector aperture 82 is formed in the side wall of cylinder head 16 in alignment with one of the access ports 74. The electrical connector 62 further includes an adapter plug 84 threadably secured to cylinder block 16 in connector aperture 82. Adapter plug 84 includes a center passage 86 for receiving a hollow insulating sleeve 88. A threaded rod 90 extends through center passage 86 and hollow insulating sleeve 88 into central bore 80 of nut 78 engaging complimentary threads formed on the inner surface of nut 78. A lock nut 92 threaded on, or formed integrally with, rod 90 abuts insulating sleeve 88 to secure sleeve 88 and rod 90 in place. As a result, an insulated electrical connection is created between opposite end 60 of heating element 44 and the outer end of rod 90 which may then be connected to an electrical source for providing current to heating element 44.

In operation, the air heater of the present invention can be selectively energized through a conventional and well known control system to heat the intake air flowing from the conduit or aftercooler 18 to improve cold engine starting and enhance engine warm-up. Intake air heater 10 may also be used during certain periods of engine operation to improve the combustion process. Heating element 44 is elongated in shape so as to extend through a significant portion of integral intake air manifold 26 thereby providing exceptional heat distribution.

The intake air heater 10 and air delivery assembly 12 of the present invention provide distinct advantages over conventional air heater and delivery assemblies. Many conventional air delivery assemblies provide an air heater housing mounted along the air delivery conduit so that the height or width of the air heater housing contributes significantly to the total height or width of the engine. However, the increase in engine size often renders the engine size outside the packaging limits of a particular engine application. Moreover, conventional intake air housings cannot be easily retrofitted on existing engines. The present invention results in many advantages over conventional air delivery assemblies by providing an intake air heater capable of being suspended in an integral intake air manifold formed in the cylinder head of the engine. By combining the use of an integral intake manifold 26 with the uniquely designed intake air heater 10 of the present invention, an air delivery assembly is produced which advantageously utilizes the volume of the integral intake air manifold for housing intake air heater 10. As a result, substantially the entire heater including frame member 42 and heating element 44 are positioned within integral intake air manifold 26. By overlapping the air heater and the cylinder head and limiting the portion of frame member 42 extending outside integral intake air manifold 26, the integrated air delivery and heater assembly of the present invention minimizes the size of the engine thereby permitting use of the engine in a greater number of applications having engine packaging size limitations.

In addition, by using a simple flange arrangement, the air heater 10 of the present invention can be easily retrofitted on existing engines without significantly increasing the size of the engine. Mounting flange portion 46 is approximately only 3 millimeters in thickness and therefore only slightly affects the size of the engine. Also, flange 46 can be easily formed with a specific number and pattern of mounting apertures so as to correspond to the mounting apertures on the cylinder head and delivery conduit of an existing engine. In many conventional engines, the air delivery conduit 18 functions as an aftercooler with heat exchanger tubes or panels carrying engine coolant positioned throughout the conduit. Many of these engines also include intake manifolds formed by separate conduits mounted on the cylinder head of the engine. The present invention avoids the need for yet another separate, large housing mounted along the air intake conduit by integrating both the intake air heater and the intake air manifold into the cylinder head. Thus, the present invention provides a simple, inexpensive intake air heater which can be easily retrofitted on an existing engine. In addition, the present invention provides a compact, more aesthetically pleasing air delivery assembly which advantageously minimizes the size of the engine.

INDUSTRIAL APPLICABILITY

The integrated air delivery assembly and intake air heater of the present invention can be used on virtually any internal combustion engine requiring the delivery of intake air, including in-line and V-type engines. The intake air heater of the present invention is particularly advantageous as an aftermarket product for retrofitting on existing engines.

I claim:

1. An intake air heater capable of being mounted inside an intake air manifold chamber formed in a cylinder head of an internal combustion engine for heating intake air flowing along an intake air flow path to multiple engine cylinders, comprising:
   a heater frame member for attachment to the cylinder head, said frame member including a flange portion for compressive positioning adjacent the cylinder head mounting surface and a recessed body portion for placement inside an intake manifold chamber formed in a cylinder head; and
   a heating element connected to said heater frame member for heating the intake air, wherein said heating element is positioned inside the integral intake air manifold chamber formed in the cylinder head when the air heater is mounted on the engine.

2. The intake air heater of claim 1, wherein said flange portion is position substantially in a single mounting plane, said heating element positioned on one side of said mounting plane along said intake air flow path downstream of said flange portion.

3. The intake air heater of claim 2, wherein said frame member is elongated in shape and said flange portion extends peripherally around said elongated frame member.

4. The intake air heater of claim 3, wherein said frame member further includes two side wall positions extending from said flange portion transverse to said mounting plane, said heating element mounted between said two side wall portions.

5. The intake air heater of claim 4, wherein said heating element is an electric issuance resistance heater and one of said side wall portions includes an access port for providing access for an electrical connection between an electrical source and said heating element.

6. An intake air delivery assembly for delivering intake air to multiple cylinders of an internal combustion engine having an engine block, comprising:
  a cylinder head mounted on the engine block including an integral intake manifold chamber formed therein for delivering intake air to the multiple cylinders; and
  an intake air heater means mounted at least partially in said integral intake manifold chamber for heating the intake air.

7. The intake delivery assembly of claim 6, wherein said cylinder head includes a bottom surface for engaging said cylinder block, a top surface formed opposite said bottom surface and a plurality of said surfaces connecting said bottom and top surfaces, said integral intake manifold chamber being formed in one of said top and said plurality of said surfaces.

8. The intake air delivery assembly of claim 7, wherein said integral intake manifold chamber is formed in said top surface.

9. The intake air delivery assembly of claim 8, wherein said intake air heater means includes a heating element and a heater frame supporting said heating element, said heater frame including a mounting flange extending along said top surface of said cylinder block and side walls extending from said mounting flange into said integral intake manifold chamber for supporting said heating element.

10. The intake air delivery assembly of claim 9, wherein said heater frame is elongated in shape and said mounting flange extends peripherally around said heater frame.

11. The intake air delivery assembly of claim 9, further including an air delivery conduit mounted adjacent said top surface of said cylinder head, said delivery conduit defining an air delivery passage communicating with said integral intake manifold, said air delivery conduit including a conduit flange, each of said conduit flange, said heater mounting flange and said top surface of said cylinder head including a plurality of mounting apertures, further including a plurality of mounting bolts, each of said mounting bolts extending through a respective set of said mounting apertures to engage said cylinder head so as to secure said air delivery conduit and said heater frame to said cylinder head.

12. The intake air delivery assembly of claim 11, wherein said air delivery conduit includes a conduit flange, each of said conduit flange, said heater flange portion and said top surface of said cylinder head including a plurality of mounting apertures, further including a plurality of mounting bolts, each of said mounting bolts extending though a respective aligned set of said mounting apertures to engage said cylinder head so as to secure said air delivery conduit and said heater frame member to said cylinder head.

13. The intake air delivery assembly of claim 7, wherein said intake air heater means includes an electric resistance heating element, said cylinder head including a connector aperture formed in one of said plurality of side surfaces, further including an electrical connector extending through said connector aperture to provide an electrical connection between said electric resistance heating element and an electrical source.

14. The intake air deliver assembly of claim 13, wherein said air heater means further includes a heater frame supporting said heating element, said heater frame including an access port, said electrical connector extending through said access port to electrically connect with said heating element.

15. The intake delivery assembly of claim 13, wherein said electric resistance heating element is positioned entirely within said integral intake manifold chamber.

16. An intake air delivery assembly for delivering intake air along an intake air flow path to multiple cylinders of an internal combustion engine having an engine block, comprising:
  a cylinder head mounted on the engine block including an integral intake manifold chamber formed therein for receiving an intake air heater, said cylinder head including a first surface for engaging said cylinder block and a second surface formed opposite said first surface,
  an air delivery conduit mounted on said cylinder head adjacent said second surface, said delivery conduit defining an air delivery passage communicating with said integral intake manifold chamber; and
  an intake air heater means mounted along the intake air flow path inside the integral intake manifold chamber, said intake air heater means including a heating element positioned in one of said integral intake manifold chamber and said delivery conduit, and a heater frame member for supporting said heating element, said frame member including a flange portion compressively positioned between said air delivery conduit and said second surface of said cylinder head and a recessed body portion for placement inside an intake manifold chamber formed in a cylinder head, said flange portion having a predetermined minimal thickness for minimizing the distance between said air delivery conduit and said second surface of said cylinder head.

17. The intake air delivery assembly of claim 16, wherein said flange portion is positioned substantially in a single mounting plane, said heating element positioned on one side of said flange portion along said intake air flow path downstream of said mounting plane.

18. The intake air deliver assembly of claim 17, wherein said frame member and said heating element are elongated in shape and said flange portion extends peripherally around said frame member.

19. The intake air delivery assembly of claim 16, wherein said heater frame member further includes two side wall portions extending from said flange; portion into said integral intake manifold chamber, said heating element mounting between said two side wall portions, said heating element being an electric resistance heater.

20. The intake air delivery assembly of claim 16, wherein said heating element includes an electric resistance heating element and said cylinder head includes a plurality of side surfaces connecting said first surface and said second surface, said cylinder head including a connector aperture formed in one of said plurality of said surfaces, further including an electrical connector extending through said connector aperture to provide an electrical connection between said electric resistance heating element and an electrical source.

* * * * *